United States Patent [19]

Sheely

[11] 4,168,746
[45] Sep. 25, 1979

[54] SINGLE WELL SURFACTANT TEST TO EVALUATE SURFACTANT FLOODS USING MULTI TRACER METHOD

[75] Inventor: Clyde Q. Sheely, Ponca City, Okla.

[73] Assignee: Continental Oil Company, Ponca City, Okla.

[21] Appl. No.: 882,697

[22] Filed: Mar. 2, 1978

[51] Int. Cl.² .................... E21B 47/00; E21B 43/22
[52] U.S. Cl. .................... 166/252; 166/270; 166/273; 73/155; 23/230 EP
[58] Field of Search ............ 166/252, 250, 251, 273, 166/270; 23/230 EP; 73/155

[56] References Cited

U.S. PATENT DOCUMENTS

| | | | |
|---|---|---|---|
| 3,590,923 | 7/1971 | Cooke, Jr. | 166/252 |
| 3,623,842 | 11/1971 | Deans | 166/252 X |
| 3,847,548 | 11/1974 | Keller | 166/252 X |
| 3,856,468 | 12/1974 | Keller | 166/252 X |
| 3,878,890 | 4/1975 | Fertl et al. | 166/252 |
| 3,990,298 | 11/1976 | Deans | 166/252 X |

Primary Examiner—Stephen J. Novosad
Attorney, Agent, or Firm—Cortlan R. Schupbach, Jr.

[57] ABSTRACT

Data useful for evaluating the effectiveness of or designing an enhanced recovery process said process involving mobilizing and moving hydrocarbons through a hydrocarbon bearing subterranean formation from an injection well to a production well by injecting a mobilizing fluid into the injection well, comprising (a) determining hydrocarbon saturation in a volume in the formation near a well bore penetrating formation, (b) injecting sufficient mobilizing fluid to mobilize and move hydrocarbons from a volume in the formation near the well bore, and (c) determining the hydrocarbon saturation in a volume including at least a part of the volume of (b) by an improved single well surfactant method comprising injecting 2 or more slugs of water containing the primary tracer separated by water slugs containing no primary tracer.

Alternatively, the plurality of ester tracers can be injected in a single slug said tracers penetrating varying distances into the formation wherein the esters have different partition coefficients and essentially equal reaction times. The single well tracer method employed is disclosed in U.S. Pat. No. 3,623,842. This method designated the single well surfactant test (SWST) is useful for evaluating the effect of surfactant floods, polymer floods, carbon dioxide floods, micellar floods, caustic floods and the like in subterranean formations in much less time and at much reduced cost compared to conventional multiwell pilot tests.

15 Claims, 3 Drawing Figures

SINGLE WELL SURFACTANT TEST TO EVALUATE SURFACTANT FLOODS USING MULTI TRACER METHOD

This invention relates to evaluation and design of flooding processes for enhanced oil recovery. More particularly, this invention relates to a method for obtaining data useful for evaluating the effectiveness of enhanced recovery processes by utilizing a single well tracer test while reducing the time necessary for evaluation by injecting 2 or more slugs of water containing the primary tracer separated by water slugs containing no primary tracer, or alternatively, by injecting a single slug containing more than one tracer.

At the present time a great need exists for additional hydrocarbons now contained in subterranean formations which have undergone primary production and for which secondary recovery is no longer economical. The recovery processes involve mobilizing and moving the hydrocarbons through a hydrocarbon bearing subterranean formation from an injection well to a production well by injecting a mobilizing fluid into the injection well are well known. Water flooding is a widely practiced example of such procedures known throughout the world. Much effort is currently being expended in developing and demonstrating surfactant floods, steam floods, micellar floods, carbon dioxide floods, polymer floods, and the like to enhance such projects.

However, hydrocarbon bearing reservoirs are each unique and can respond in many unexpected and unpredictable ways to application of such complex processes. Therefore one of the factors inhibiting more rapid development of such enhanced recovery methods, particularly surfactant flooding, polymer flooding, and the like is the tailoring of a process to a particular reservoir. Specifically, applications of surfactant systems are unpredictable because so many parameters influence the surfactant systems.

Commercial practice currently is to use all of the knowledge available, including laboratory data and reservoir properties, to design a best evaluation of what will be technically feasible and most cost effective in the reservoir under production, and then to conduct a pilot project for each reservoir to prove out or redesign the flood process to avoid problems encountered.

The major problem with the commercial approach currently in practice is that the pilot projects are very expensive and require extended lead times before commercial production begins. For example, a pilot project to evaluate a surfactant or polymer flood can be expected to cost a minimum of 3 million dollars. An illustration of such costs is the BERC-76/4, October, 1976 progress review No. 8 Contracts and Grants for Cooperative Research on Enhancement of Recovery of Oil and Gas, and other current references reveal that the Energy Research and Development Administration (ERDA) supported project in the El Dorado field had an original estimated cost of over 7 million dollars. The project in the Burbank field had an estimated cost of almost 10 million dollars, the Belcreek field over 5 million dollars, the Bradford field over 4 million dollars, and so forth. Many larger companies are also conducting pilots independently, having costs of this magnitude. Clearly, only the expectation of considerable recovery can justify such long term risk expense. The time involved for such evaluation normally extends over a number of years thus requiring that only larger reservoirs be evaluated, necessitating that only organizations with considerable risk capital can afford to evaluate these processes.

Clearly a great need has existed for a less expensive and more rapid method of field evaluation and tailoring for such flooding processes in specific reservoirs.

The single well tracer method utilized in the process of this invention is disclosed in U.S. Pat. No. 3,623,842 hereby incorporated by reference. This patent forms the basis of a license package for a method for determining hydrocarbon saturation in subterranean reservoirs, and along with related know-how and software has been widely licensed in the petroleum industry. Supplemental references are found in U.S. Pat. No. 3,590,923, SPE paper 5840 prepared for the improved oil recovery symposium of the Society of Petroleum Engineers of AIME presented in Tulsa, OK on Mar. 22-24, 1976, by Clyde Q. Sheely entitled "Description of Field Test to Determine Residual Oil Saturation by Single Well Tracer Method"; J. F. Tomick et al "Single Well Tracer Method to Measure Residual Oil Saturation" published in the Journal of Petroleum Technology, February, 1973 pages 211-218; and U.S. Pat. No. 4,099,565 in which I am a co-inventor. However, this method has a disadvantage in that different tracer pairs are utilized for different depths of "seeing" into the subterranean formation, thus requiring that several tests be carried out, each requiring several months. These disclosures are likewise incorporated by reference.

It would therefore clearly be of great benefit to provide a method for the efficient determination of the effectiveness of or design of an enhanced recovery process for a particular reservoir. The instant invention provides such a method and constitutes a substantial advance in the art since cost is greatly reduced in that only one bore hole need be drilled and that the reservoir can be measured using several different tracers during one test run, thus greatly reducing the time required.

It is therefore an object of the instant invention to provide methods for the aquisition of data useful to evaluate the effectiveness of or design an enhanced recovery process for hydrocarbons from subterranean reservoirs. Other objects will become apparent to those skilled in this art as the description proceeds.

In one method, data useful to evaluate the effectiveness of or design an enhance recovery process is obtained, the recovery process involving mobilizing the moving hydrocarbons through a hydrocarbon bearing subterranean formation from an injection well to a production well, by injecting a mobilizing fluid into the injection well, comprising (a) determining hydrocarbon saturation in a volume in the formation near a well bore penetrating the formation, (b) injecting sufficient mobilizing fluid to mobilize and move hydrocarbons from a volume in the formation near the well bore, and (c) determining the hydrocarbon saturation in a volume including at least a part of the volume of (b) by an improved single well tracer method comprising injecting 2 or more slugs of water containing the primary tracer separated by water slugs containing no primary tracer. This method is designated the single well surfactant test (SWST).

An alternate embodiment of the present invention determines hydrocarbon saturation at a multiplicity of points from which the hydrocarbons are moved by employing an improved single well tracer method involving injecting a plurality of ester tracers at varying distances into the formation wherein the esters have different partition coefficients and essentially equal reaction times. In this embodiment the tracers will be injected in a single slug.

According to another aspect of the instant invention, the process is useful to evaluate surfactant floods, water floods, carbon dioxide floods, polymer floods, micellar floods, caustic floods and the like in a reservoir in much less time and at greatly reduced costs than in the prior art methods.

The method of the instant invention is useful for obtaining data which can be used to evaluate the effectiveness of or design an enhanced recovery process for a particular reservoir. Enhanced recovery processes involve mobilizing and moving hydrocarbons through a hydrocarbon bearing subterranean formation from an injection well to a production well by injecting a mobilizing fluid into the injection well. The hydrocarbons are produced through a production well. The mobilizing fluid can be micellar solutions, a gas such as comprising carbon dioxide, soluble oils in aqueous surfactant containing mixture, brine, a micro-emulsion, a gas comprising air, an aqueous solution containing caustic or an aqueous liquid thickened with a polymer. Combinations of these methods can also be employed and are well-known to those skilled in this art. For example, a slug of an aqueous liquid which contains a surfactant mixture can be injected into an injection well followed by an aqueous liquid slug thickened with polymer to affect mobility control which in turn in followed by an injection of water, brine, or the like to mobilize and move the hydrocarbons through the formation to the vicinity of a production well from which the hydrocarbons are removed from the subterranean formation.

The present invention is useful in those processes wherein the aqueous mixture containing a surfactant is injected as a slug followed by a larger slug of water or brine. The surfactant containing mixture can be a micellar solution, a micro emulsion, clear emulsion, soluble oil, surfactant solubilized in water or brine or the like. These systems are known to be the most difficult to design to fit the many reservoir perameters currently known.

The hydrocarbon saturation determination of the first step of the process of this invention can be by any method known to the art. For example, pore data can be obtained and evaluated. Logs of various types can be employed, such as neutron activation logs and the like. The log-inject-log method can be employed. Preferably, the hydrocarbon saturation in this step is determined by the single well tracer method.

The single well tracer method employed in the third step of this invention and which can be employed in the first step is the method disclosed by U.S. Pat. No. 3,623,842 as supplemented by the auxilary references cited.

Mobilizing fluid described for the instant invention is an aqueous solution and the determination of step (a) of the solution is usually by the single well tracer method. The mobilizing fluid can be an aqueous liquid containing a surfactant.

In the instant invention the single well tracer method employed in step (a) and (c) comprises a method for determing the relative amounts of oil and water in a subterranean reservoir formation by injecting therein at varying distances from the well bore multiple fluid slugs, said solution comprising a carrier fluid reactant followed by an inert water slug containing no carrier fluid reactant followed by another solution comprising a carrier fluid reactant. Clearly as many of this sequence can be carried out is desired, but normally only 2 or 3 will be carried out. In any event, each combination of carrier reactant solution injected contains a carrier fluid being substantially insoluble in the immobile fluid phase and miscible with the mobile fluid phase and a reactant, said reactant being capable of forming within the formation at least 2 tracers which have different partition coefficients between the carrier fluid and immobile phase, the concentration of the reactant in the carrier fluid and the reactivity of the reactant being sufficiently great to enable detection of 2 of said tracers within each phase.

The carrier fluid tracer solution formed is then displaced within the formation through the formation following said displacement and the 2 tracers formed from each reactant injected are detected, a chromatographic property related to one of two tracers is measured and a chromatographic property related to the other of two tracers generated from each injected reactant is measured to determine the relative amounts of oil and water in the formation.

Normally, the carrier fluid is an aqueous liquid, the reactant is hydrolyzable ester, and the tracers are unreacted ester and the alcohol formed by hydrolysis of the ester. Usually the carrier fluid reactant solution is injected at a location in a well and is withdrawn from the same location at the same well. Representative examples of tracers are unreacted ethyl acetate and ethanol, n-propyl formate and n-propyl alcohol.

In one embodiment, the slug of aqueous liquid containing a surfactant injected in step (b) is followed by a slug of aqueous liquid thickened with a polymer to effect mobility control followed by sufficient volumes of water to remove polymer from pores in the formation. Normally, about 10 volumes of water as based on the pore volume of the area tested is required. The surfactant-containing slug can be a micellar solution and the surfactant-containing slug can also contain a hydrocarbon sulfonate, a sulfated alkoxylated linear alcohol, and a basic material.

In some subterranean reservoirs, the afore described method will not be as effective as separately carried out tests because of a carryover or "smear" of the tracers injected, such that no determination can be made. The problem can be alleviated in part by selecting tracers which have different partition coefficients and which are of differing mobilities in the formation; however, these tracers may not be initially easily definable and some length of time and experimentation could be necessary before the proper tracers can be utilized.

In these reservoirs the alternate method for obtaining data from a multiplicity of points useful for evaluating the effectiveness of or to design enhanced recovery process is used. Data can be obtained by a process which comprises sequentially (a) determining hydrocarbon saturation in the hydrocarbon bearing formation at a locus in the formation near a well bore penetrating the formation using a single well tracer method, (b) injecting mobilizing fluid to mobilize and move hydrocarbons in the formation near the well bore, and (c) determining hydrocarbon saturation at a multiplicity of points from which the hydrocarbons are moved by employing an improved single well tracer involving injecting a plurality of ester tracers at varying distances into the formation, wherein the esters have different partition coefficients and essentially equal reaction times.

Thus, if two or more, usually three or more esters having different partition coefficients are used in a single injection, the three or more required runs using the same ester could be replaced by a single injection at a savings of time and expense. For example, a test could be made using methyl formate, ethyl formate, and n-butyl formate instead of making a repeated run of different formation volumes using any one of the tracers. Combinations of esters can be found which will be suitable for temperature of the particular reservoir being tested. As with the conventional single well tracer test, a gas chromatography unit is capable of determining the concentrations of the tracers, both primary and secondary in the produced well.

Specific embodiments and parameters of this alternate method include using an aqueous liquid containing a surfactant as a mobilizing fluid. In addition, when the hydrocarbons are mobilized and moved in step (b) by injecting a slug of aqueous liquid containing a surfactant followed by a slug of aqueous liquid thickened with a polymer to effect mobility control, the slug should be followed by sufficient volumes of water to flush polymers from the pores in the formation. Normally about 10 pore volumes of water based on the pore volume of the area tested.

In an alternate embodiment the single well tracer method employed in step (a) and step (c) will comprise a method for determining the relative amounts of oil and water from at least two pore volumes of injected carrier fluid and reaction solution in a subterranean reservoir formation which comprises injecting into the formation a single carrier fluid/multiple reaction solution, comprising a carrier and at least a first and second reaction solution. The carrier reacts with each of the said reactants, the carrier fluid being substantially insoluble in the immobile fluid phase and miscible with the mobile fluid phase, and each of the reactants is capable of forming within the formation at least two tracers which have different partition coefficients between the carrier fluid and immobile phase. Concentration of the reactant in the carrier fluid and the reactivity of the reactant is sufficiently great to enable detection of two of the tracers from each of the carrier fluid-reactant combinations. Carrier fluid tracer solution is then displaced through the formation for each pair formed within the formation and, following said displacement, said tracers are detected for each reaction pair originally injected. Normally said detection is carried out by measuring a chromatographic property related to one of the two tracers and a chromatographic property related to the other of the two tracers for each reactant injected into the well, thus determining the relative amounts of oil in the subterranean formation.

Representative examples of the carrier fluids are aqueous liquids where the reactants are hydrolyzable esters and where the tracers are unreacted esters and the alcohol formed by hydrolysis of the esters. Normally the carrier fluid reactant solution pairs are injected simultaneously at a location in the well and are withdrawn from the same location at the same well. Representative examples of tracers useful in the practice of the instant invention are ethyl acetate, methyl acetate, isopropyl acetate, ethyl acetoacetate, ethyl acrolate, ethyl methacrolate, ethyl butylate and ethyl benzoate. Others useful are ethylene glycol, monomethyl ether acetate, monoethyl ether acetate, and monobutyl ether acetate. isopropylacetate, isobutyl acetate, isobutyl methacrolate, methyl acrylate, methyl methacrylate, methyl benzoate, dimethyl succinate dimethyl glutarate, ethyl formate, propyl formate, and isopropyl formate. All these materials form a readily detectable tracer upon reaction under hydrolysis in the formation.

Figure 1:
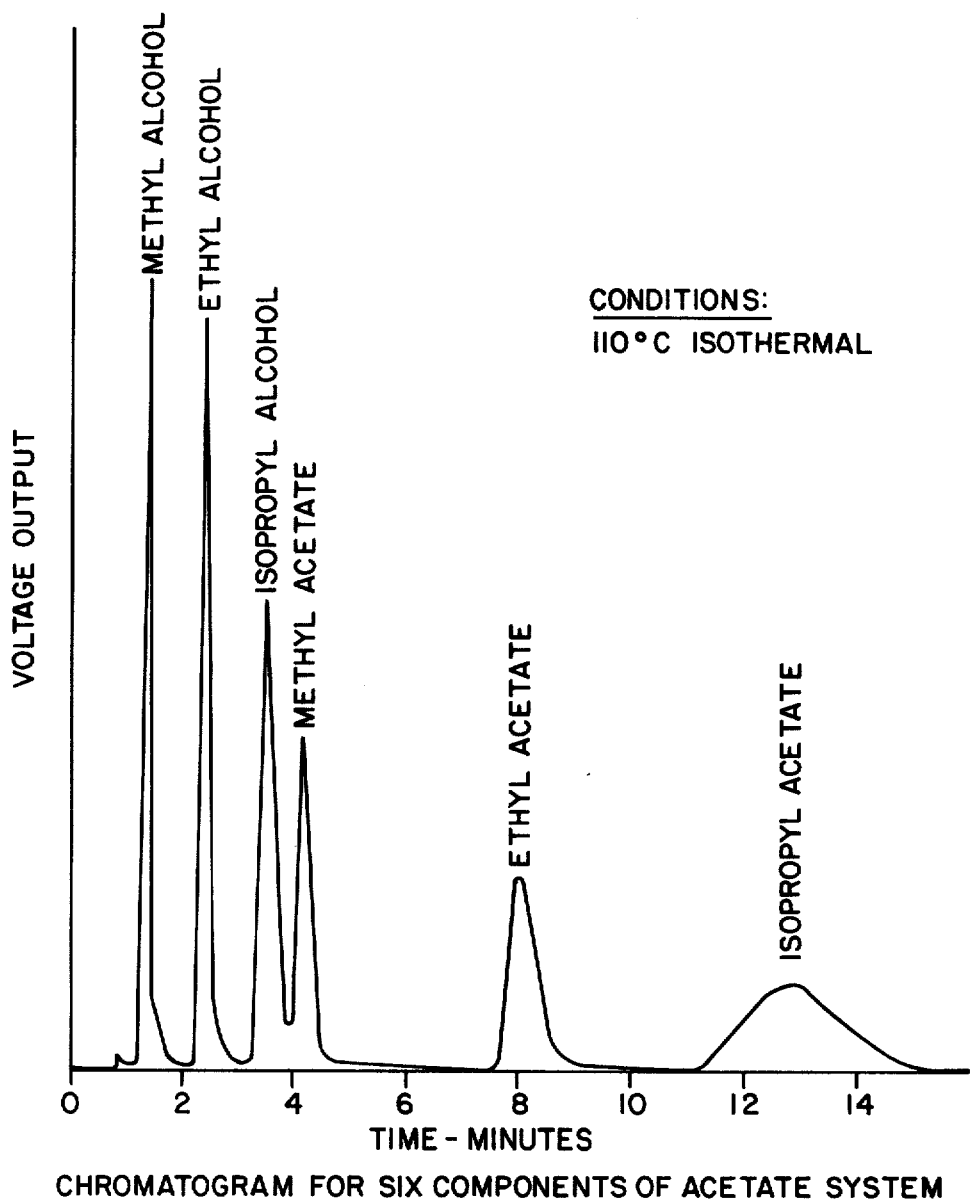
FIG. 1 shows a separation chromatograph for a specific 6 component acetate system illustrating the peak separation.

These examples are provided to more explain the present invention and provide information on the operation of the method to those skilled in the art. However, these examples are exemplary only and do not function as limitations on the invention described and claimed.

EXAMPLE 1

The method of the instant invention described above uses the single well tracer test (SWTT) for determining residual oil saturation. The SWTT has the capability of determining average residual oil saturation over a relatively large contacted pore volume. Initially, a single well tracer test is carried out to determine the residual oil saturation after water flood using a new well that has been produced or flooded to a watered out condition. Subsequently, the single well surfactant test (SWST) is carried out.

After the SWTT is carried out a small slug of surfactant is injected followed by a polymer bank of tapered concentration for mobility control. Efficient brine is injected to move banked oil out of the test area and remove the effect of polymer on subsequent tracer tests. Normally about 10 pore volumes of brine based on the pore volume of the area tested is necessary. After these injections the oil saturation is near zero for the contacted volume near the well bore. The oil saturation will increase as the contacted volume increases. At a point distant from the well bore in the formation the small slug will lose its effectiveness and the oil saturation will remain at water flood residual. Multiple injections of a reactive tracer each injection separated by water slugs, is then carried out.

Twenty-five barrels of water containing about 1% of a reactive tracer followed by about 75 barrels of water, followed by a second slug containing the reactive tracer in the amount of twenty-five barrels of water containing about 1% tracer followed by a final 75 barrels of water. The material normally used as tracer is ethyl acetate. Other useful tracers are methyl acetate and isopropyl acetate. Either weight percent or volume percent can be used, so long as consistancy is maintained throughout the tests.

The materials are injected into the formation reservoir at 118° F. and allowed to soak for a period of about 20 days at which time the material is recovered in sequence and a curve of oil displacement is calculated based as a function of surfactant slug size vs reservoir volume which was contacted by the surfactant. By including the flow capacity distribution from core analysis the oil displacement can be related to surfactant slug size based on the total reservoir volume.

EXAMPLE 2

To illustrate the varying differences in reservoirs, the test described in Example 1, which would be carried out in a 118° F. reservoir was computer modeled in the Big Muddy field, Wyoming. In Example 2 a computer run was made to see if the multiple slug method would be useable for the Big Muddy reservoir.

The first computer run used three slugs of the same tracer, each of about 5% pore volume slug size and each followed by a drive slug of about 25 pore volume percent. It was found that there would not be enough definition in the resulting tracer curves to analyze the single well surfactant test (SWST). Two slugs instead of the three slugs of Example 1 were also attempted and again there was not enough definition in the tracer curves to warrant using this method in the Big Muddy reservoir based upon the reservoir conditions.

Experimental work was carried out to determine whether putting different tracers having different partitions coefficients in the same slug would be efficient in a single well tracer test. Accordingly, a list of organic chemicals was prepared and tested for acid ionization constants (which is a rough guide to the hydrolysis rate) and the carbon number (which is a rough indication of the partitioning in the oil phase, the higher the carbon number the more partitioning in oil). Some representative tracers are shown in Table 1.

Table 1

| Ester | Acid Ionization Constant | Carbon Number |
|---|---|---|
| Ethyl Acetate | 1.8 | 4 |
| Ethyl Acetoacetate | 26.2 | 6 |
| Ethyl Acrylate | 5.6 | 5 |
| Ethyl Butylate | 1.5 | 6 |
| Ethyl Methacrylate | 5 | 6 |
| Ethyl Oxalate | 5,900 | 4 |
| Ethyl Benzoate | 6.5 | 9 |
| Ethylene Glycol Monomethyl Ether Acetate | 1.8 | 5 |
| Ethylene Glycol Monoethyl Ether Acetate | 1.8 | 6 |
| Ethylene Glycol Monobutyl Ether Acetate | 1.8 | 8 |
| Isopropyl Acetate | 1.8 | 5 |
| Isobutyl Acetate | 1.8 | 6 |
| Isobutyl Acrylate | 5.6 | 7 |
| Isobutyl Methacrylate | 5 | 8 |
| Methyl Acrylate | 5.6 | 4 |
| Methyl Methacrylate | 5 | 5 |
| Methyl Benzoate | 6.5 | 8 |
| Methyl Salicrylate | 107 | 8 |
| Dimethyl Succinate | 6.9 | 6 |
| Dimethyl Glutarate | 4.6 | 7 |
| Dimethyl Phthalate | 130 | 10 |
| Dimethyl Fomarate | 93 | 6 |
| Dimethyl Maleate | 1,420 | 6 |
| Ethyl Formate | 17.7 | 3 |
| Propyl Formate | 17.7 | 4 |

The net effect of higher partition coefficients is that less pore volume is contacted for a given injection water volume. Since one of the objectives of the SWST is to contact as large a reservoir pore volume as possible, selection of tracers was made based upon this criterion. It should be noted that any produced water sample has the possibility of containing three esters as well as their corresponding alcohols. Therefore there must be adequate elution separation of 6 different organic compounds when using gas liquid chromatography (GLC). This would rule out, for example, using both methyl acetate and methyl acrylate in the same test.

Upon considering these problems together with the fact that the temperature in the Big Muddy field in Wyoming is about 118° F., methyl, ethyl, and isopropyl acetates were selected as the best system. While the hydrolysis rate was somewhat slower than preferred, a three week shut-in period would yield sufficient hydrolysis for definition.

These three materials were put in a volume of water at about a ½% concentration by weight and then tested on a flame ionization gas chromatogram to determine whether the six components could be separated. The chromatogram test was carried out at 110° F. and the separation is shown in FIG. 1.

While isopropyl alcohol and methyl acetate GLC peaks were close, no separation problems were envisioned.

Reaction rate test work showed that the hydrolysis rates of the three esters are about equal. However, methyl acetate is slightly faster than ethyl acetate, which in turn is slightly faster than isopropyl acetate. Tests were carried out in buffered solutions having pHs of 6, 7, 8, and 9. The hydrolysis of all three esters increased with increasing pH, starting with the 6.0 pH initially tested. Solutions were buffered as shown in Table 2. The hydrolysis rate test results are shown in Tables 3, 4, and 5.

Table 2

CONTENTS OF BUFFERED SOLUTIONS

| | 0.2N NaOH Sol'n (8 grams in 1 liter) 0.2N KH$_2$PO$_4$ Sol'n (27.2 grams in 1 liter) 0.2N H$_3$PO$_3$ Sol'n (12.4 grams in 1 liter) | | | | |
|---|---|---|---|---|---|
| pH | NaOH Sol'n ml | KH$_2$PO$_4$ Sol'n ml | H$_3$PO$_3$ Sol'n ml | Water, ml | Total Sol'n ml |
| 6.0 | 11.4 | 100.0 | — | 88.6 | 200.0 |
| 7.0 | 59.26 | 100.0 | — | 40.74 | 200.0 |
| 8.0 | 93.6 | 100.0 | — | 6.4 | 200.0 |
| 9.0 | 42.6 | — | 100.0 | 57.4 | 200.0 |

Table 3

SUMMARY OF REACTION RATE TESTS USING METHYL ACETATE

| | Total Time Days | pH | INTEGRATOR COUNTS MEOH | INTEGRATOR COUNTS MEOAC | % MEOAC by Vol |
|---|---|---|---|---|---|
| 6.0 pH | Start | 6.0 | 4,009 | 61,548 | .5000 |
| | 4 | 6.0 | 1,431 | 63,482 | .5157 |
| | 6 | 6.0 | 1,657 | 58,121 | .4722 |
| | 8 | 6.0 | 1,707 | 60,982 | .4954 |
| | 11 | 6.0 | 2,555 | 61,615 | .5005 |
| | 14 | 5.9 | 2,966 | 61,250 | .4976 |
| | 20 | 5.6 | 4,271 | 20,474 | .4913 |
| 7.0 pH | Start | 7.0 | 2,171 | 67,131 | .5000 |
| | 4 | 6.9 | 5,963 | 58,982 | .4393 |
| | 6 | 6.8 | 7,248 | 48,974 | .3648 |
| | 8 | 6.8 | 9,380 | 50,598 | .3769 |
| | 11 | 6.8 | 10,010 | 46,134 | .3436 |
| | 14 | 6.7 | 11,530 | 42,959 | .3200 |
| | 20 | 6.7 | 13,358 | 38,359 | .2857 |
| 8.0 pH | Start | 8.0 | 2,075 | 65,069 | .5000 |
| | 4 | 7.0 | 11,744 | 39,592 | .3042 |
| | 6 | 7.0 | 13,856 | 34,235 | .2631 |
| | 8 | 7.0 | 15,139 | 30,832 | .2369 |
| | 11 | 7.0 | 16,274 | 28,469 | .2188 |
| | 14 | 7.0 | 18,955 | 24,734 | .1901 |
| | 20 | 6.8 | 20,297 | 20,258 | .1557 |
| 9.0 pH | Start | 8.9 | 2,245 | 64,865 | .5000 |
| | 4 | 6.5 | 20,876 | 24,554 | .1893 |
| | 6 | 6.3 | 20,113 | 20,581 | .1586 |
| | 8 | 6.0 | 18,717 | 21,814 | .1681 |
| | 11 | 5.9 | 19,065 | 22,393 | .1726 |
| | 14 | 5.9 | 19,261 | 22,426 | .1729 |

Table 3-continued

SUMMARY OF REACTION RATE TESTS USING METHYL ACETATE

| | Total Time Days | pH | INTEGRATOR COUNTS MEOH | INTEGRATOR COUNTS MEOAC | % MEOAC by Vol |
|---|---|---|---|---|---|
| | 20 | 5.6 | 19,917 | 21,591 | .1664 |

Table 4

SUMMARY OF REACTION RATE TEST USING ETHYL ACETATE

| | Total Time Days | pH | INTEGRATOR COUNTS ETOH | INTEGRATOR COUNTS ETOAC | % ETOAC by Vol |
|---|---|---|---|---|---|
| 6.0 pH | Start | 6.0 | Trace | 88,839 | .5000 |
| | 4 | 6.0 | 996 | 85,786 | .4828 |
| | 6 | 6.0 | 1,078 | 85,907 | .4835 |
| | 8 | 6.0 | 1,806 | 87,965 | .4951 |
| | 11 | 5.9 | 2,756 | 84,960 | .4782 |
| | 14 | 5.8 | 2,964 | 82,463 | .4641 |
| | 20 | 5.8 | 5,965 | 82,108 | .4621 |
| 7.0 pH | Start | 7.0 | Trace | 92,380 | .5000 |
| | 4 | 7.0 | 4,904 | 81,737 | .4424 |
| | 6 | 6.8 | 7,034 | 77,207 | .4179 |
| | 8 | 6.8 | 9,203 | 76,831 | .4158 |
| | 11 | 6.8 | 11,092 | 71,520 | .3871 |
| | 14 | 6.8 | 14,522 | 67,421 | .3649 |
| | 20 | 6.8 | 18,739 | 62,891 | .3404 |
| 8.0 pH | Start | 8.0 | 545 | 85,865 | .5000 |
| | 4 | 7.5 | 13,597 | 62,108 | .3617 |
| | 6 | 7.4 | 15,843 | 56,162 | .3270 |
| | 8 | 7.5 | 20,325 | 53,312 | .3104 |
| | 11 | 7.4 | 23,543 | 46,206 | .2691 |
| | 14 | 7.2 | 27,573 | 42,083 | .2451 |
| | 20 | 7.2 | 31,796 | 36,609 | .2132 |
| 9.0 pH | Start | 9.0 | 1,127 | 88,729 | .5000 |
| | 4 | 7.5 | 37,901 | 25,872 | .1458 |
| | 6 | 6.8 | 36,212 | 20,906 | .1178 |
| | 8 | 6.8 | 40,323 | 23,770 | .1339 |
| | 11 | 6.5 | 35,135 | 22,484 | .1267 |
| | 14 | 6.4 | 42,225 | 21,501 | .1212 |
| | 20 | 6.1 | 39,176 | 21,513 | .1212 |

Table 5

SUMMARY OF REACTION RATE TEST USING ISOPROPYL ACETATE

| | Total Time Days | pH | INTEGRATOR COUNTS IPA | INTEGRATOR COUNTS IPAC | % IPAC by Vol |
|---|---|---|---|---|---|
| 6.0 pH | Start | 6.0 | Trace | 95,440 | .5000 |
| | 4 | 6.0 | Nil | 91,501 | .4794 |
| | 6 | 6.0 | Nil | 91,521 | .4795 |
| | 8 | 6.0 | Trace | 91,064 | .4771 |
| | 11 | 6.0 | 635 | 92,050 | .4822 |
| | 14 | 5.8 | 850 | 95,124 | .4983 |
| | 20 | 5.8 | 1,616 | 89,648 | .4697 |
| 7.0 pH | Start | 7.0 | Nil | 98,414 | .5000 |
| | 4 | 7.0 | 1,340 | 87,893 | .4465 |
| | 6 | 7.0 | 1,855 | 86,736 | .4407 |
| | 8 | 7.0 | 2,688 | 93,881 | .4770 |
| | 11 | 7.0 | 3,773 | 92,179 | .4683 |
| | 14 | 7.0 | 4,620 | 81,728 | .4152 |
| | 20 | 7.0 | 6,783 | 81,691 | .4150 |
| 8.0 pH | Start | 8.0 | Nil | 94,467 | .5000 |
| | 4 | 7.9 | 5,692 | 80,640 | .4268 |
| | 6 | 7.9 | 8,233 | 76,725 | .4061 |
| | 8 | 8.0 | 9,950 | 77,596 | .4107 |
| | 11 | 7.9 | 13,226 | 75,083 | .3974 |
| | 14 | 7.7 | 15,631 | 62,611 | .3314 |
| | 20 | 7.7 | 18,889 | 66,969 | .3545 |
| 9.0 pH | Start | 9.0 | Nil | 99,613 | .5000 |
| | 4 | 8.2 | 29,248 | 39,418 | .1979 |
| | 6 | 8.2 | 38,803 | 31,562 | .1584 |
| | 8 | 8.2 | 41,277 | 34,326 | .1723 |
| | 11 | 8.0 | 44,605 | 28,735 | .1442 |
| | 14 | 8.0 | 47,536 | 17,741 | .0890 |
| | 20 | 7.9 | 49,649 | 12,579 | .0632 |

Figure 2:
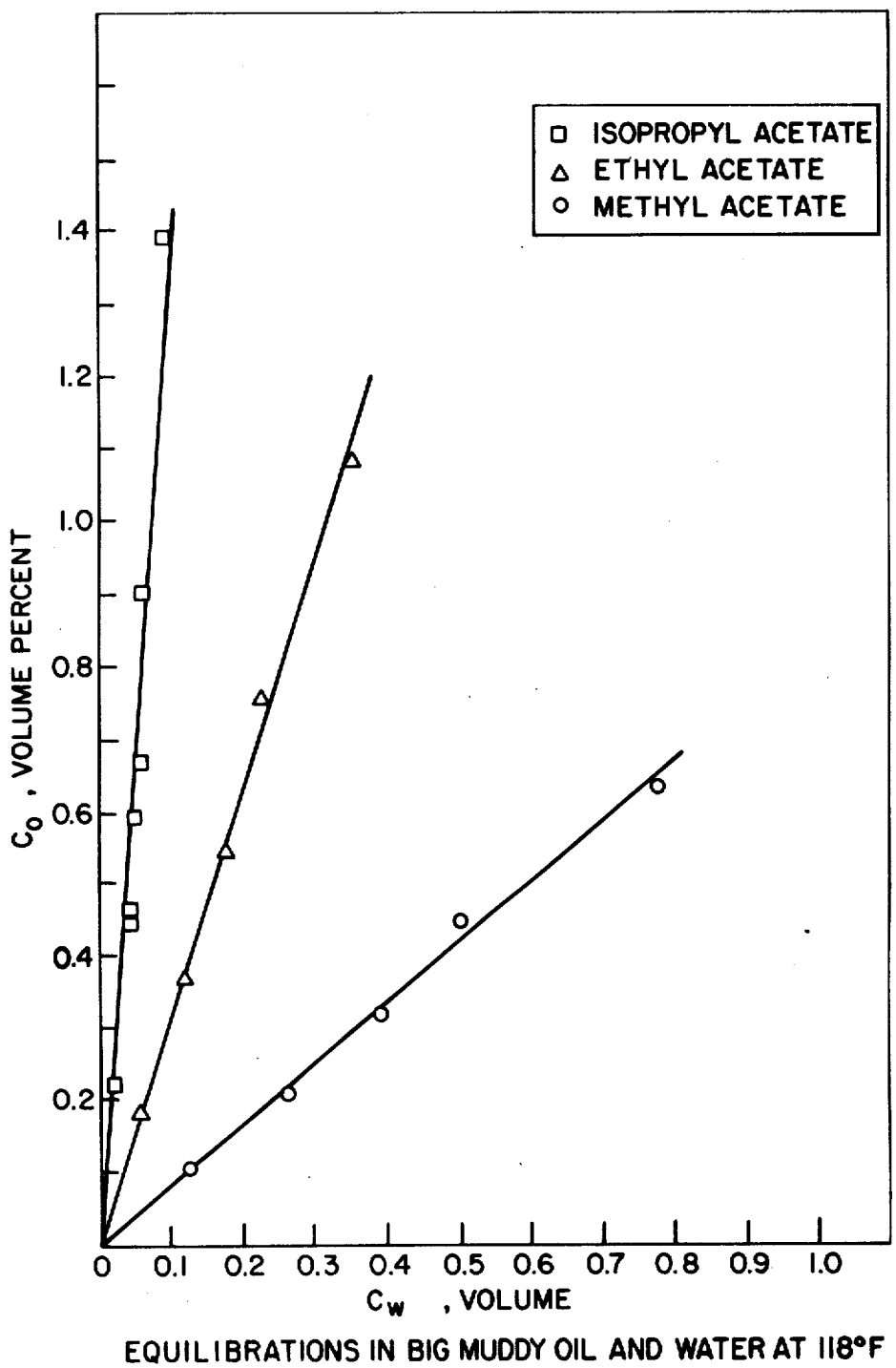
FIG. 2 shows partition coefficient determinations of 3 acetate tracers in Big Muddy, Wyoming oil and water.

Standard partition coefficient determinations were carried out for all three tracers at initial water concentrations of about 0.25; 0.50; 0.75; 1.0; and 1.5 weight percent for each. The results of these runs are presented in Table 6 and illustrated graphically in FIG. 2. Integrator counts are directly related to tracer concentration.

Table 6

PARTITION COEFFICIENT DETERMINATIONS

| Ester | Wt of Water Phase, gm | Wt of Crude, gm | Initial Conc of Ester in Water, Wt Percent | Equil Conc of Ester in Water Wt Percent | Final Conc Ester in Water Vol Percent | Calc Conc of Ester in Oil, Vol Percent | Partition Coefficient |
|---|---|---|---|---|---|---|---|
| Methyl Acetate | 33.8 | 34.0 | 0.2509 | 0.1257 | 0.1293 | 0.10645 | 0.8234 |
| | 34.0 | 33.8 | 0.5012 | 0.2591 | 0.2665 | 0.2083 | 0.7816 |
| | 34.0 | 33.9 | 0.7525 | 0.3848 | 013958 | 0.3154 | 0.7969 |
| | 34.0 | 33.4 | 0.9996 | 0.4906 | 0.5046 | 0.4432 | 0.8782 |
| | 34.0 | 34.0 | 1.5005 | 0.7672 | 0.7891 | 0.6272 | 0.7948 |
| Ethyl Acetate | 33.4 | 33.7 | 0.2504 | 0.0524 | 0.0582 | 0.1844 | 3.168 |
| | 34.0 | 34.0 | 0.5000 | 0.1140 | 0.1266 | 0.3565 | 2.817 |
| | 34.0 | 33.8 | 0.7500 | 0.1631 | 0.1811 | 0.5452 | 3.011 |
| | 34.3 | 33.0 | 0.9989 | 0.2121 | 0.2355 | 0.7552 | 3.207 |
| Isopropyl Acetate | 33.5 | 33.2 | 0.2508 | 0.0184 | 0.92164 | 0.2228 | 10.28 |
| | 34.0 | 33.7 | 0.5007 | 0.0401 | 0.0459 | 0.4426 | 9.642 |
| | 34.4 | 33.0 | 0.5000 | 0.0367 | 0.0420 | 0.4594 | 10.95 |
| | 33.7 | 33.4 | 0.6820 | 0.0494 | 0.9571 | 0.5984 | 10.71 |
| | 34.0 | 34.0 | 0.7629 | 0.0559 | 0.0640 | 0.6733 | 10.52 |
| | 34.8 | 33.2 | 1.0003 | 0.0612 | 0.0701 | 0.9375 | 13.37 |
| | 34.0 | 33.4 | 1.0000 | 0.0556 | 0.0637 | 0.902 | 14.6 |
| | 34.4 | 33.4 | 1.5000 | 0.0822 | 0.0941 | 1.390 | 14.78 |

Figure 3:
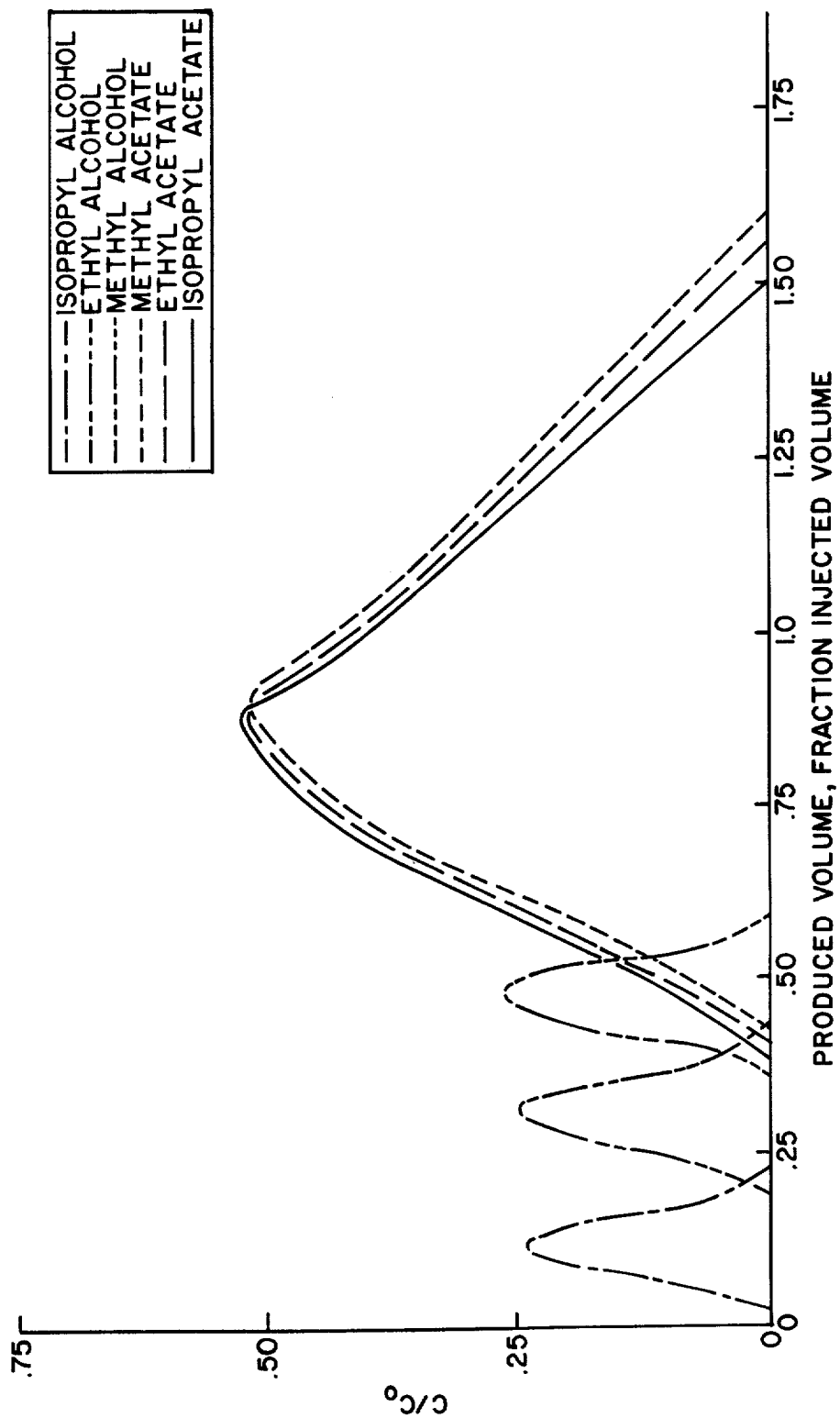
FIG. 3 indicates the resulting determination obtained after a 20 day shut-in period.

After injection and a shut-in period of about 20 days withdrawal is made from the reservoir and results are determined much as indicated in FIG. 3. It can be seen that the various tracers are easily discernable. The scales used are produced concentrations over injected concentrations versus produced volume as a fraction of injected volume.

When the test is carried in the field, it is necessary to obtain several average residual oil saturations ($S_{OR}$), which can be obtained at several different volumes in the reservoir using only one injection, thus allowing the average residual oil saturations to be plotted by methods known in the art.

Using the average retardation factor for each tracer injected for accumulative injected volume contacted by that tracer, calculations can be made to determine the cumulative contacted volume, the delta injection volume, and the delta contacted volume using techniques described in the art incorporated by reference. The retardation factor which approximates the point retardation factor can be used to calculate the point residual oil saturation using well-known techniques.

Thus the data obtained according to the method of the instant invention is useful for evaluating the effectiveness of or designing an enhanced recovery process while greatly decreasing the costs and time involved, since only one injection need be made yet several volumes in the reservoir can be examined using the single injection. It will be apparent that any other aids for determining these methods, such as computers, can be used in the resultant designing. However, the use of the data generated by the instant method is within the ability of those skilled in the art and is not within the scope of the process claimed.

While certain embodiments and details have been shown for the purpose of illustrating this invention, it will be apparent to those skilled in this art that various changes and modifications may be made herein without departing from the spirit or the scope of the invention.

I claim:

1. A method for obtaining data useful to evaluate the effectiveness of or to design an enhanced recovery process, the recovery process involving mobilizing and moving hydrocarbons through a hydrocarbon bearing subterranean formation from an injection well to a production well by injecting a mobilizing fluid into the injection well, comprising
   (a) determining hydrocarbon saturation in a volume in the formation near a well bore penetrating the formation,
   (b) injecting sufficient of the mobilizing fluid to mobilize and move hydrocarbons from a volume in the formation near the well bore, and
   (c) determining the hydrocarbon saturation in a volume including at least a part of the volume of (b) by an improved single well tracer method comprising injecting 2 or more slugs of water containing the primary tracer separated by water slugs containing no primary tracer.

2. A method as described in claim 1 wherein the mobilizing fluid is an aqueous solution and wherein the determination of step (a) is by a single well tracer method.

3. A method as described in claim 2 wherein the mobilizing fluid comprises an aqueous liquid containing a surfactant.

4. A method as described in claim 3 wherein the single well tracer method employed in steps (a) and (c) comprises a method for determining the relative amounts of oil and water in a subterranean reservoir formation by injecting therein at varying distances from the well bore multiple fluid slugs which comprises injecting into the formation a solution comprising a carrier fluid reactant followed by an inert water slug containing no carrier fluid reactant, followed by another solution comprising a carrier fluid-reactant, followed by an inert water slug, and a final carrier fluid-reactant solution, followed by a final inert water slug, each combination of carrier reactant solution containing a carrier fluid being substantially insoluble in the immobile fluid phase and miscible with the mobile fluid phase, and a reactant, said reactant being capable of forming within the formation at least two tracers which have different partition coefficients between the carrier fluid and immobile phase, the concentration of the reactant in the carrier fluid and the reactivity of the reactant being sufficiently great to enable detection of two of said tracers within each phase; displacing the carrier fluid-tracer solution formed within the formation through the formation following said displacement, detecting said two tracers formed from each reactant injected, and measuring a chromatographic property related to one of the said two tracers and a chromatographic property related to the other of said two tracers generated from each injected reactant to determine the relative amounts of oil and water in the formation.

5. A method as described in claim 4 wherein the carrier fluid is an aqueous liquid, the reactant is a hydrolyzable ester, and the tracers are unreacted ester and the alcohol formed by hydrolysis of the ester, and wherein the carrier fluid reactant solution is injected at a location in a well and is withdrawn from the same location at the same well.

6. A method as described in claim 5 wherein the tracers are unreacted ethyl acetate and ethanol, n-propyl formate and n-propyl alcohol.

7. A method as described in claim 6 wherein the slug of aqueous liquid containing a surfactant injected in step (b) is followed by a slug of aqueous liquid thickened with a polymer to affect mobility control, followed by sufficient volumes of water to remove polymer from pores in the formation.

8. A metod as described in claim 7 wherein the surfactant containing slug is a micellar solution and wherein the surfactant containing slug contains a hydrocarbon sulfonate, a sulfated alkoxylated linear alcohol and a basic material.

9. A method as described in claim 8 wherein data suffucient to plot a hydrocarbon saturation profile is obtained.

10. A method for obtaining data from a multiplicity of points useful to evaluate the effectiveness or to design an enhanced recovery process are obtained by a process which comprises sequentially
    (a) determining hydrocarbon saturation in the hydrocarbon bearing formation at a locus in the formation near a well bore penetrating the formation by a single well tracer method,
    (b) injecting mobilizing fluid to mobilize and move hydrocarbons in the formation near the well bore, and
    (c) determining hydrocarbon saturation at a multiplicity of points from which the hydrocarbons are moved by employing an improved single well tracer involving injecting a plurality of ester tracers at varying distance into the formation wherein the esters have different partition coefficients and essentially equal reaction times.

11. A method as described in claim 10 wherein the mobilizing fluid comprises an aqueous liquid containing a surfactant.

12. A method as described in claim 11 wherein the hydrocarbons are mobilized and moved in step (b) by injecting a slug of aqueous liquid containing a surfactant followed by a slug of aqueous liquid thickened with a polymer to affect mobility control followed by sufficient volumes of water to flush polymers from pores in the formation.

13. A method as described in claim 12 wherein the single well tracer method employed in step (a) and step (c) comprises a method for determining the relative amounts of oil and water from at least 2 volumes of injected carrier fluid and reaction solution in a subterranean reservoir formation which comprises injecting into the formation a single carrier fluid/multiple reactant solution, comprising a carrier and at least a first and second reaction solution, said carrier reacting with each of said reactants said carrier fluid being substantially soluble in the immobile fluid phase and immiscible with the mobile fluid phase, each of the reactants being capable of forming within the formation at least two tracers which have different partition coefficients between the carrier fluid and immobile phase, the concentration of the reactant in the carrier fluid and the reactivity of the reactant being sufficiently great to enable detection of 2 of said tracers from each of the carrier fluid-reactant combinations, displacing the carrier fluid-tracer solution through the formation for each pair formed within the formation, following said displacement, detecting said tracers for each reaction pair originally injected, and measuring a chromatographic property related to the other of said two tracers for each reactant injected into the well to determine the relative amounts of oil in the formation.

14. A method as described in claim 13 wherein the carrier fluids are aqueous liquids wherein the reactants are hydrolyzable esters, and wherein the tracers are unreacted esters in the alcohol formed by hydrolysis of the esters and wherein the carrier fluid reactant solution pairs are injected simultaneously at a location in the well and are withdrawn from the same location at the same well.

15. A method as described in claim 14 wherein the tracers are ethyl acetate, methyl acetate and isopropyl acetate, and the corresponding tracer formed within the formation is ethyl alcohol, methyl alcohol, and isopropyl alcohol, respectively.

* * * * *